United States Patent [19]

Taylor et al.

[11] Patent Number: 4,761,137

[45] Date of Patent: Aug. 2, 1988

[54] COLOR COORDINATION CONE

[76] Inventors: John W. Taylor, 15 Alcott St.; Robert M. Sweeney, 63 Blossom St., both of Lowell, Mass. 01852

[21] Appl. No.: 7,910

[22] Filed: Jan. 28, 1987

[51] Int. Cl.$^4$ .............................................. G09B 19/00
[52] U.S. Cl. ...................................... 434/99; 434/102; 434/104; 132/9
[58] Field of Search ................. 132/7, 9; 434/99, 100, 434/135, 145, 287, 377, 101, 102, 104, 98; 116/63 P, 63 C

[56] References Cited

U.S. PATENT DOCUMENTS 2,333,273 11/1943 Scanlon .............................. 116/63 C

FOREIGN PATENT DOCUMENTS 617495 2/1961 Italy .................................... 116/63 P Primary Examiner—Robert P. Swiatek
Assistant Examiner—R. Thomas Price
Attorney, Agent, or Firm—John P. McGonagle

[57] ABSTRACT

A color coordination cone which permits a hair colorist to examine color mixtures before actual application. It is comprised of an internally illuminated cone-shaped base apparatus over which one or more transparent color cones comprised of twenty-four longitudinal color bands in eleven shades is placed. The color cones are rotated one over the other to examine the effect of mixing one color with another. In another embodiment of the invention, a colorless, transparent conical sheath with external tracks in radial planes corresponding to the edges of color cone shade levels is slid over the color cone. Elongated strips in various hues are slid between certain sets of adjacent tracks so that a particular hue on a strip will be positioned over a particular hue on the color cone and the results determined.

13 Claims, 6 Drawing Sheets

COLOR COORDINATION CONE

BACKGROUND OF THE INVENTION

This invention relates generally to color coordination, and in particular to a device which coordinates hair color bases so that a hair colorist can visually see the effects of mixing various colors prior to actual application.

There are three primary colors, namely Red, Yellow, and Blue, which produce all color. The even mixture of any two primary colors will result in a secondary color, i.e., Red+Yellow=Orange, Blue+Yellow=Green, and Red+Blue=Violet. The even mixture of a primary and a secondary color will result in a tertiary color, i.e., Red-Orange, Red-Violet, Blue-Violet, Blue-Green, Yellow-Green, and Yellow-Orange. The twelve resultant colors, i.e., three primary, three secondary, and six tertiary, form the conventional twelve color scale commonly used by hair colorists.

Given today's complexity of hair coloring, a larger scale is required. To increase the number of colors available to a hair colorist, triple tertiary groups are formed. A triple tertiary group is formed by mixing: Primary+Tertiary=P+T, Primary+Secondary=T, and Secondary+Tertiary=S+T. For example: Yellow(P)+Yellow-Green(T)=Light Yellow-Green (P+T), Yellow(P)+Green(S)=Yellow-Green (T), and Green(S)+Yellow-Green(T) =Green-Yellow (S+T). By making triple tertiary groups instead of single tertiaries, a twenty-four color scale consisting of three primary colors, three secondary colors, and eighteen tertiary colors is formed.

When coloring hair various colors are nearly always mixed together to either form a new color, to neutralize an existing color, or to change the tone of a color. When dealing with terms such as blond, brown, red and black as applied to hair colors, it is easy to lose track of the fact that every shade of blond, brown, red and black is formed from one or more base colors. When mixing two hair colors together, the base colors must be taken into account. For example, hair colors with a red color base mix well with hair colors having a violet color base. However, hair colors with a green base do not mix well with violets. If a light blond color having a yellow base is mixed with a light blond color having a blue base, the mixture when applied to light blond or white hair will reflect green. This is often not apparent until actually applied to the hair. A neutralizer with a red color must then be applied to neutralize the green. This can also be a problem when making subtle tone changes in hair. The base compositions must be determined and taken into account to avoid unexpected results. Certain colors when mixed together will neutralize each other. Examples of this are: Blue and Orange, Green and Red, and Yellow and Violet. When neutralizing a hair color with a blue color base, if a hair colorist inadvertently uses a neutralizer with a yellow base rather than an orange base, the results will not be neutralization but rather green hair.

SUMMARY OF THE INVENTION

The present invention allows the hair colorist to examine color mixtures before actual application, thus avoiding unexpected results. The invention is comprised of a lighted cone-shaped apparatus over which a first transparent plastic cone is placed. The plastic cone is comprised of twenty-four longitudinal color bands, in the color scale as described above, equipositioned about the circumference of the cone and running from the cone's base to the cone's apex. Each color band varies in shading in eleven steps resulting in each color band having eleven hues with the lightest hues being at the base end of the cone, and the darkest hues being at the apex end of the cone. A second plastic cone, a duplicate of the first plastic cone, is slid over the first plastic cone. Means for turning the second plastic cone about the first plastic cone gives the hair colorist the ability to examine the effects of mixing various colors in a given shade. The present invention also provides means for examining the effects of mixing various colors of different shades together.

DETAILED DESCRIPTION OF THE INVENTION

Figure 1:
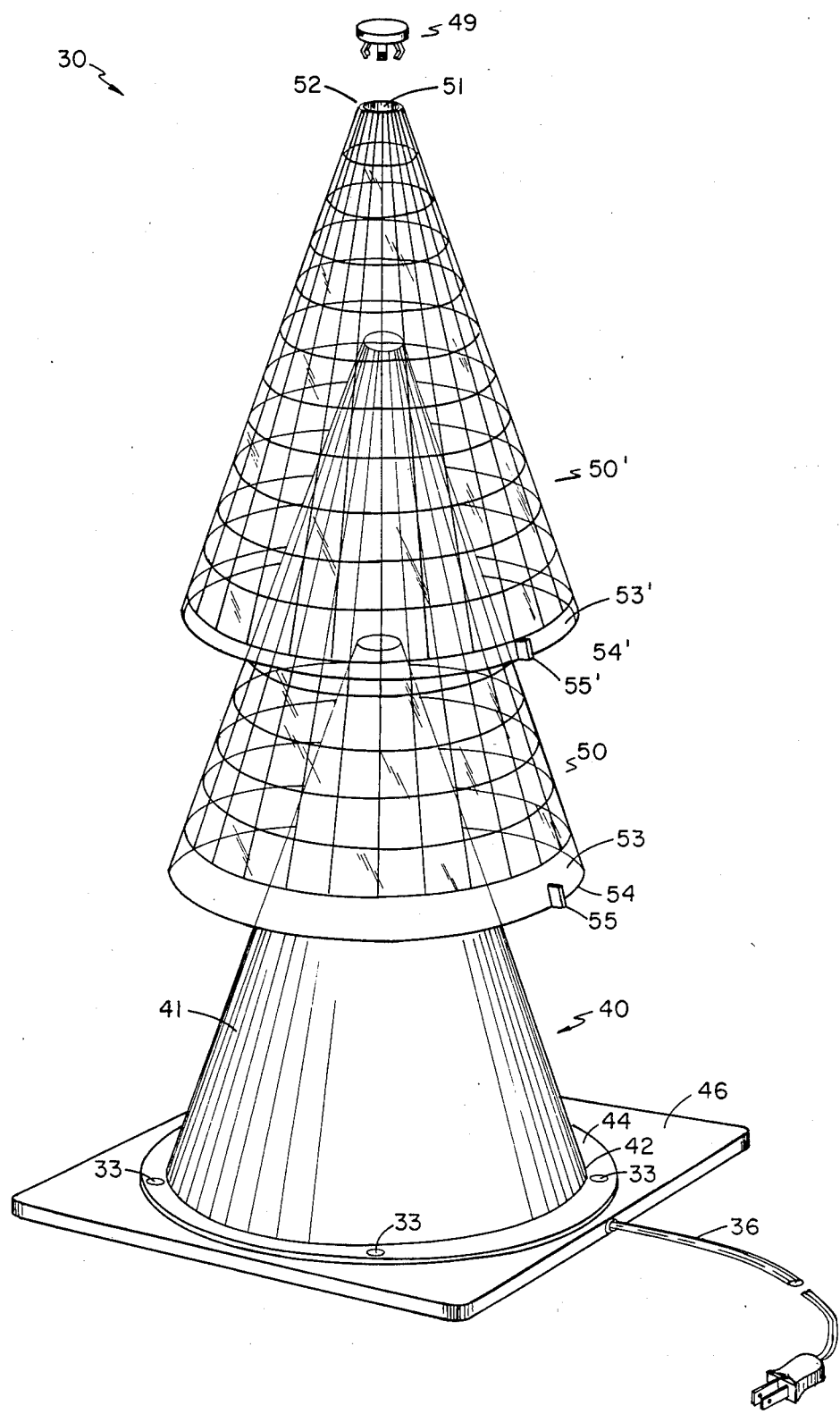
FIG. 1 is a partially exploded perspective view of one embodiment of the present invention.
Figure 2:
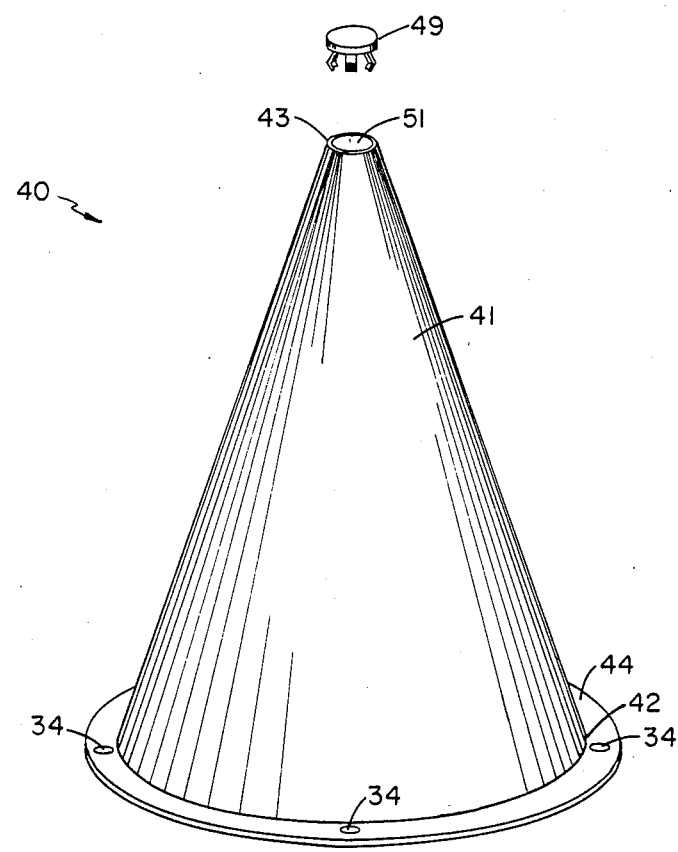
FIG. 2 further explodes the embodiment illustrated in FIG. 1.
Figure 2:
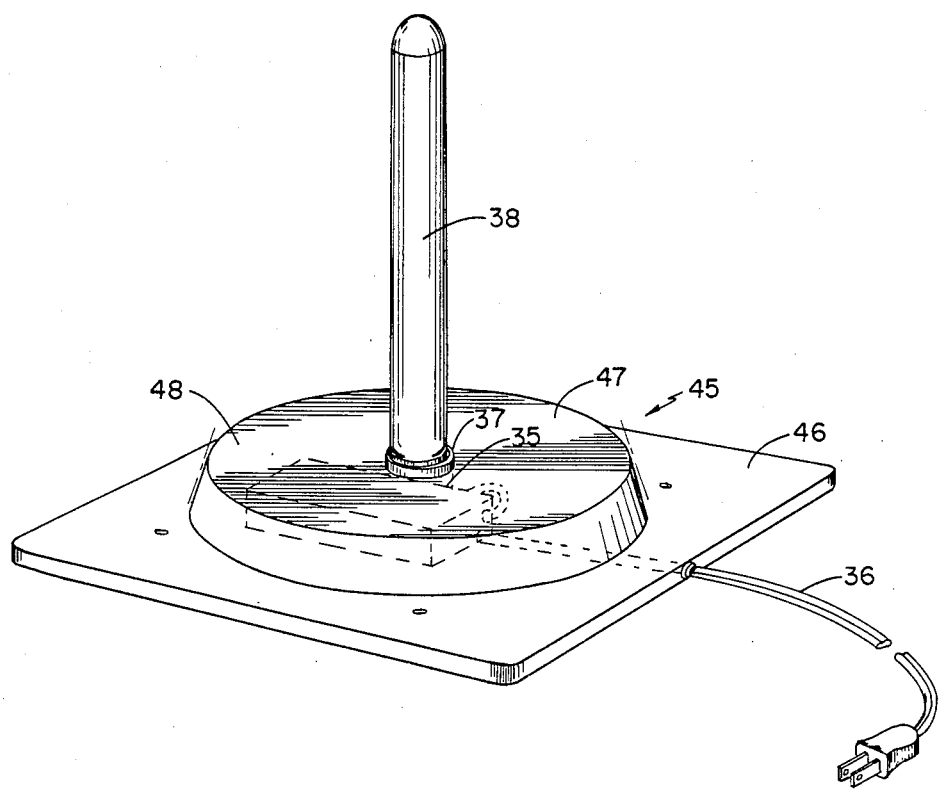

Referring more particularly to the drawings wherein like numerals indicate like elements, reference numeral 30 refers generally to the color coordination cone comprising the present invention. FIGS. 1 and 2 illustrate partially exploded perspective views of one embodiment of the present invention 30. The invention 30 is comprised of an illuminated base apparatus 40 and one or more transparent, sheath-like color cones 50 fitted over the illuminated base apparatus. The color cones 50 are generally identical to one another.

Figure 4:
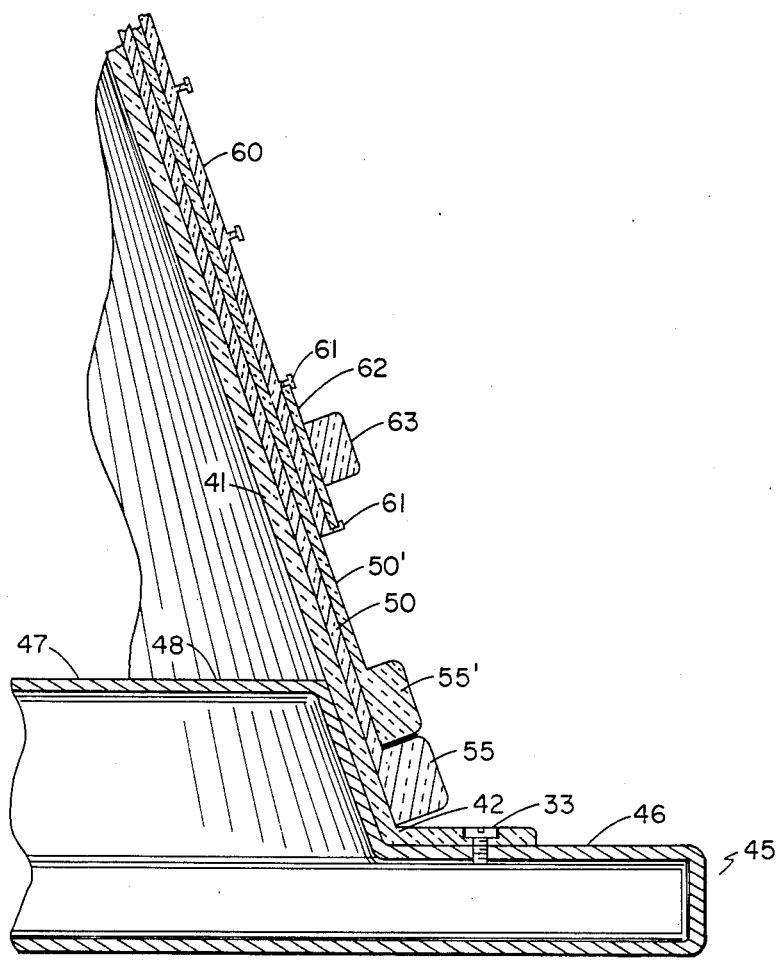
FIG. 4 is a partial, side cross-sectional view of the embodiment illustrated in FIG. 3.

The base apparatus 40 can most clearly be understood from FIGS. 1, 2, and 4, and is comprised of an internally illuminated conical member 41 resting or attached to a pedestal 45. The pedestal 45 is a generally flat substructure with a raised, round, inverted pan-like structure 47 centrally positioned on its top side 46. The external diameter of the inverted pan-like structure 47 is approximately equal to the internal diameter of the conical member's base end 42. Contained within the pedestal 45 is an electrical socket 35 connected by means of an ordinary power cord 36 to an energy source. The electrical socket's lip 37 opens onto and lies in a plane approximately equal to the plane in which the inverted pan-like structure's face 48 lies at the face's 48 approximate center. An elongated, true-white, color-corrected, fluorescent light bulb 38 is inserted into the electrical socket 35 and extends perpendicularly upward from the inverted pan-like structure's face 48. The conical member 41 is placed over the bulb 38 and is rigidly attached to the pedestal 45 with conventional fasteners 33 such as screws through holes 34 in a flange 44 formed at the conical member's base end 42, which flange 44 extends away from the conical member 41 in the radial plane at the conical member's base end 42. The conical member 41 is concentrically placed about the pan-like structure 47. This provides proper positioning of the conical member 41 as well as rigidity and support. The conical member 41 is semitransparent and is made of a frosted plexiglass or a frosted glass or a similarly functioning material. The conical member's 41 purpose is to provide an evenly diffused, radially emanating, true white light through the color cones 50 when said cones 50 are placed on the conical member 41. The conical member's apex 43 is defined by an opening into which a snap-lock device 49 is inserted. The snap-lock 49 holds the color cones 50 on the conical member 41. The base apparatus 40 may be laid flat on a table, platform, etc., or may be hung on a wall, display, etc.

The color cones 50 are placed over and on the conical member 41. The color cones 50 snugly fit over the conical member 41 and are held on the conical member 41 by means of the snap-lock fastener 49 inserted through openings 51 in the apex 52 of each color cone 50 into the apex opening 43 in the conical member 41. The color cone 50 is radially divided into eleven radial shading zones A through K, and a twelfth radial buffer zone 53 near the color cone base 54. A small tab 55 is attached near the base 54 in the color cone's buffer zone 53. The tab 55 assists the hair colorist in rotating a color cone 50 about the conical member 41. A second color cone 50' may be placed over the first color cone 50. The second color cone 50' is identical to the first color cone 50 with respect to the eleven radial shading zones A through K, but has buffer zone 53' approximately one-half the width of the first color cone's buffer zone 53. The second color cone 50' also has a tab 55' attached to its buffer zone 53'. This arrangement permits an exact overlay of each of the color cone's radial shading zones A through K and A' through K' while still allowing independent rotation of each color cone 50 and 50' without their tabs 55 and 55' interfering with each other.

Figure 5:
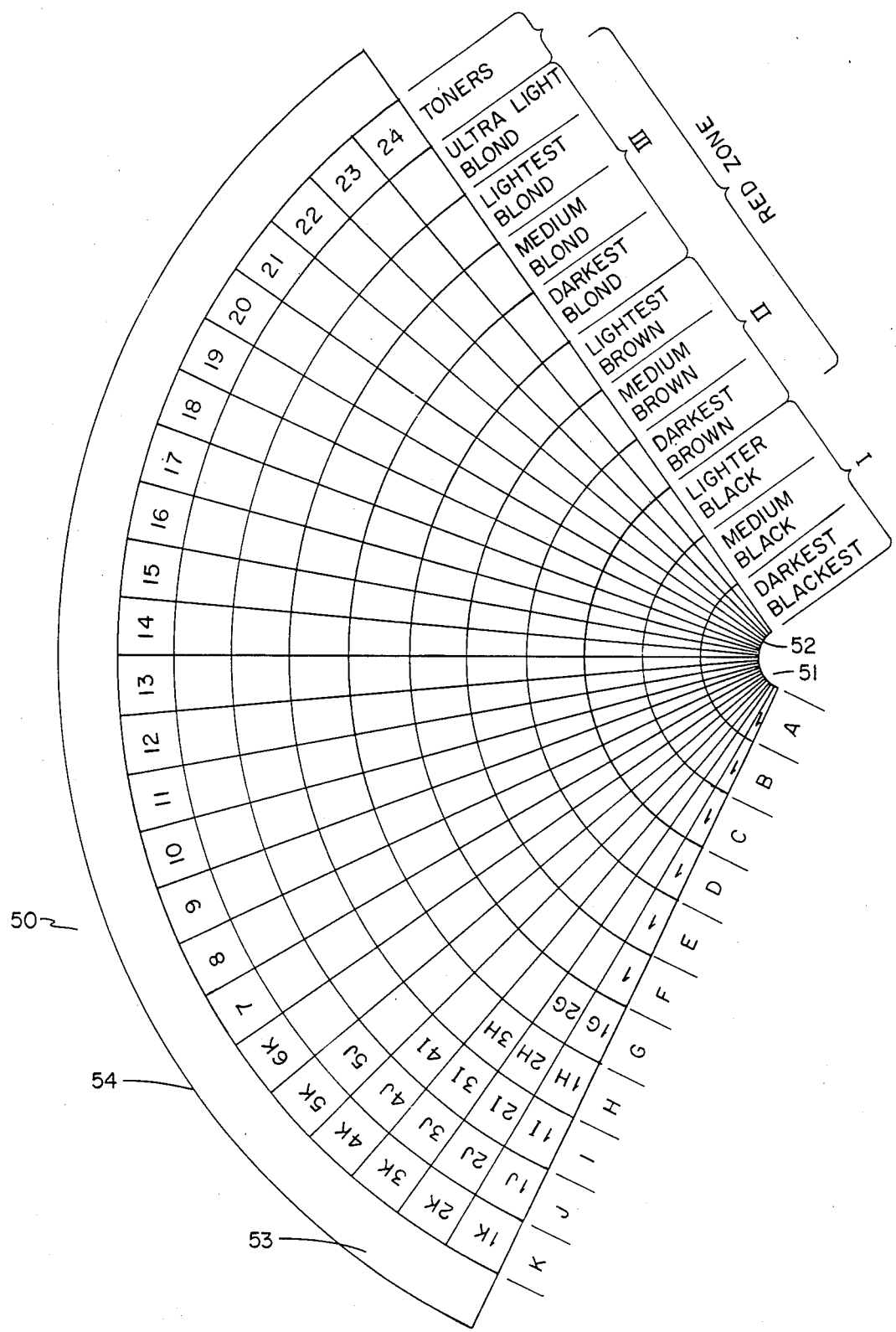
FIG. 5 is a side plan view of one of the color cones of FIG. 1 flattened out for purposes of illustration.
Figure 6:
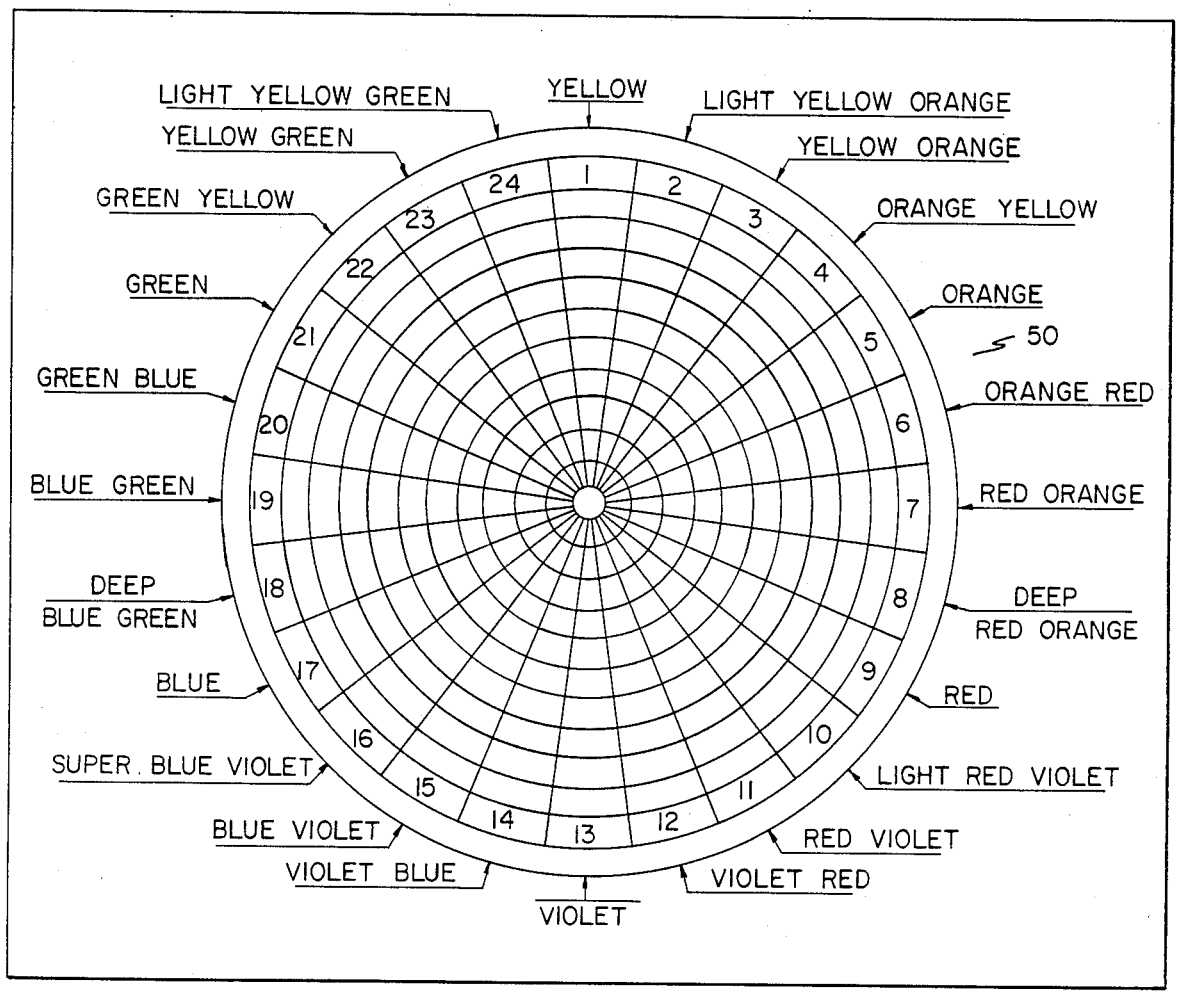
FIG. 6 is a schematic top plan view of one of the color cones of FIG. 1.

FIGS. 5 and 6 illustrate the panel layout of a color cone 50. There are twenty-four longitudinal color bands 1 through 24, equipositioned across the color spectrum and formed from the three primary colors as described in the Background Section above. The color bands 1 through 24 lie longitudinally along the surface of the color cone 50, equipositioned about the circumference of the color cone 50. Color bands 1 through 12 form the warm colors, and color bands 13 through 24 form the cool or ash colors. Each of the color bands 1 through 24 varies in shading as described above in eleven uniform steps A through K, from the darkest shade A at the color cone's apex 52 to the lightest shade K beside the color cone's buffer zone 53. The combination of a shade and color forms a hue. The combination of eleven radial shading zones A through K and twenty-four color bands 1 through 24 forms two hundred sixty-four different hues 1A, 1B, . . . 24J, 24K. The shading zones A through K are formed into four groups. Group I is comprised of shading zones A, B, and C, and make up the black hair hues. Group II is comprised of shading zones D, E, and F. Colors 1 through 12 in Group II make up red hair hues, and colors 13 through 24 make up brown hair hues. Group III is comprised of shading zones G, H, I, and J. Colors 1 through 12 in Group III also make up red hair hues, but colors 13 through 24 make up blond hair hues. The fourth group, IV, are the toners comprised of the lightest shading zone K.

In operation, the two color cones 50 and 50' are placed over the conical member 41 and held onto the member 41 by means of the snap-lock fastener 49. The true-white, diffused light emanating from the conical member 41 through the color cones 50 and 50' illuminates the various hues in their true colors for the observer. This embodiment of the invention 30 is used for coordinating colors 1, 2, . . . 24 within the same shading zone A, B, . . . K. The top or second color cone 50' is rotated about the first color cone 50 until the colors being examined are aligned, one over the other. The results of intermixing two different colors will be instantly apparent. For more complex color analysis additional color cones 50 may be added.

Figure 3:
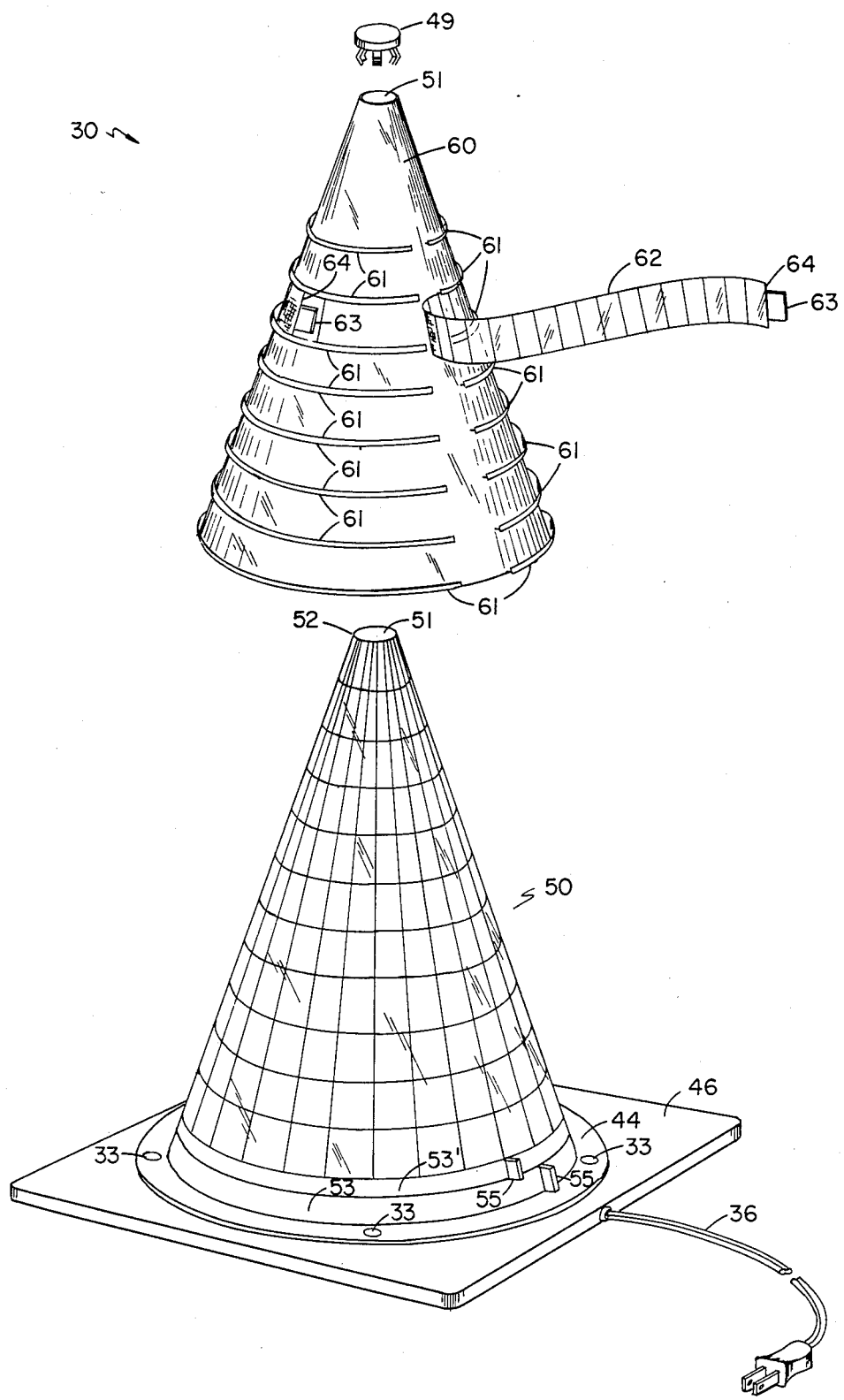
FIG. 3 is a partially exploded perspective of another embodiment of the present invention.

In another embodiment of the invention 30 varying shade levels A through K, as well a colors 1 through 24 may be examined. FIGS. 3 and 4 illustrate this embodiment. The color coordination cone 30 of FIG. 1 is assembled. The color cones 50 and 50' are perfectly aligned one 50' over the other 50 so that each hue 1A' through 24K' of the top color cone 50' is perfectly aligned over the same hue 1A through 24K of the other color cone 50. A colorless, transparent, conical sheath 60 is placed over the color cones 50 and 50'. The sheath 60 extends over the color cones 50 and 50' to and including shade level J. Tracks 61 are externally attached about the circumference of the sheath 60 in radial planes corresponding to the edges of the color cones' shade levels D through J. The sheath 60 is held in place over the color cones 50 and 50' by means of the snap-lock fastener 49. Elongated strips 62 consisting of twenty-four color panels 1 through 24 in hues corresponding to the hues in a given shade level D, E, F, G, H, I, or J on a color cone 50 are slid between a set of tracks 61 and aligned over the color cones 50 and 50' so that a particular hue on the strip 62 will be positioned over a particular hue on the color cones 50 and 50' and the results examined. To assist in sliding the strip 62 between a pair of tracks 61 a small finger tab 63 is attached to the ends 64 of each strip 62. Several strips 62 of various or similar shading may be placed between a pair of tracks 61. The color cones 50 and 50' may also be shifted to vary underlying colors within a shading. If desired, the hair colorist may remove or add additional color cones 50 before placing the sheath 60 onto the invention 30.

The present invention 30 has wide application in hairdressing salons and schools. The general conical shape of the invention 30 improves the observer's ability to distinguish and differentiate color and shade combinations. In the embodiment of the invention described above, the conical member 41 has a base diameter of twelve inches and a longitudinal axis of eighteen inches. Smaller versions approximately six by nine inches are also envisioned. The power cord 36 and the external energy source could also be easily replaced with a self-contained battery system, thereby enhancing the present invention's portability.

It is understood that the above described embodiments are merely illustrative of the application. Other embodiments may be readily devised by those skilled in the art which will embody the principles of the invention and fall within the spirit and scope thereof.

We claim:
1. A color coordination cone which permits a hair colorist to examine color and shading mixture before actual application, comprising:
   an internally illuminated base apparatus;
   a plurality of transparent, sheath-like color cones rotatably fitted over said base apparatus;
   a colorless, transparent, conical sheath fitted over said color cones, said sheath having a plurality of radial tracks externally attached about its circumference; and a plurality of elongated color strips slid between pairs of adjacent said tracks.

2. A color coordination cone as recited in claim 1, wherein the base apparatus comprises:

a pedestal;

a semitransparent, conical member mounted base first on said pedestal; and illumination means positioned within said conical member.

3. A color coordination cone as recited in claim 2, wherein:

each color cone has twenty-four color bands, equipositioned across the color spectrum, lying longitudinally along the cone's surface, and each color band varying in shading in a plurality of uniform steps, from the darkest shade at the color cone's apex to the lightest shade near the color cone's base.

4. A color coordination cone as recited in claim 3, wherein:

said tracks are externally attached about the circumference of said sheath in radial planes corresponding to the edges of the color cone's shading steps.

5. A color coordination cone as recited in claim 4, wherein:

said color strips have twenty-four panels corresponding to the twenty-four color bands of each of said color cones.

6. A color coordination cone as recited in claim 5, wherein:

the illumination means is an elongated, true white, color corrected, fluorescent light bulb conentrically placed within and along the longitudinal axis of the conical member, and electrically connected to a power source.

7. A color coordination cone as recited in claim 6, wherein:

each color cone is rotatable about its longitudinal axis.

8. A color coordination cone as recited in claim 7, wherein:

the conical member is made of a frosted plexiglass.

9. A color coordination cone as recited in claim 8, wherein:

the color cones, conical member, and sheath have openings at their apexes.

10. A color coordination cone as recited in claim 9, further comprising:

a fastener inserted into the apex openings in the sheath, color cones and the conical member for holding the sheath and color cones onto the conical member.

11. A color coordination cone as recited in claim 10, wherein:

each color cone has a finger tab near its base.

12. A color coordination cone as recited in claim 11, wherein:

each said color strip has a finger tab at each end.

13. A color coordination cone as recited in claim 12, wherein:

the plurality of color strips is comprised of a strip in each of the shading steps on a color cone.

* * * * *